(12) United States Patent
Levin

(10) Patent No.: US 6,655,484 B2
(45) Date of Patent: Dec. 2, 2003

(54) HYBRID POWERTRAIN HAVING ROTARY ELECTRIC MACHINE, INCLUDING ENGINE-DISCONNECT CLUTCH, BETWEEN INTERNAL COMBUSTION ENGINE AND TRANSMISSION

(75) Inventor: Michael Benjamin Levin, Ann Arbor, MI (US)

(73) Assignee: Ford Motor Company, Dearborn, MI (US)

(*) Notice: Subject to any disclaimer, the term of this patent is extended or adjusted under 35 U.S.C. 154(b) by 260 days.

(21) Appl. No.: 09/728,888

(22) Filed: Dec. 2, 2000

(65) Prior Publication Data

US 2002/0066607 A1 Jun. 6, 2002

(51) Int. Cl.⁷ .................................................. F02N 11/04
(52) U.S. Cl. ........................ 180/65.2; 180/65.3; 180/65.8
(58) Field of Search ................................ 180/65.2, 65.1, 180/65.3, 65.8; 324/207.2, 660; 701/22; 290/36 R, 46, 47, 32, 31, 27, 22, 19, 15, 14, 12, 11, 10, 40 C; 310/68 B

(56) References Cited

U.S. PATENT DOCUMENTS

| | | | | |
|---|---|---|---|---|
| 5,258,651 A | * | 11/1993 | Sherman | 180/65.2 |
| 5,427,196 A | * | 6/1995 | Yamaguchi et al. | 180/65.2 |
| 5,693,993 A | * | 12/1997 | Ito et al. | 310/68 B |
| 5,773,904 A | * | 6/1998 | Schiebold et al. | 180/65.2 |
| 5,833,022 A | * | 11/1998 | Welke | 180/65.2 |
| 6,022,287 A | * | 2/2000 | Klemen et al. | 180/65.2 |
| 6,073,713 A | * | 6/2000 | Brandenburg et al. | 180/65.2 |
| 6,177,734 B1 | * | 1/2001 | Masberg et al. | 290/31 |
| 6,184,603 B1 | * | 2/2001 | Hamai et al. | 180/65.2 |
| 6,208,036 B1 | * | 3/2001 | Evans et al. | 180/65.2 |
| 6,222,362 B1 | * | 4/2001 | Schulter et al. | 324/207.25 |
| 6,225,715 B1 | * | 5/2001 | Hoda et al. | 310/67 R |
| 6,354,974 B1 | * | 3/2002 | Kozarekar | 180/65.2 |
| 6,364,042 B1 | * | 4/2002 | Joachim | 180/65.2 |
| 6,367,337 B1 | * | 4/2002 | Schlabach | 180/443 |
| 6,373,155 B1 | * | 4/2002 | Shimizu et al. | 310/68 B |
| 6,380,641 B2 | * | 4/2002 | Matsubara et al. | 290/40 C |
| 2001/0017226 A1 | * | 8/2001 | Ohsawa | 180/65.2 |
| 2002/0033605 A1 | * | 3/2002 | Shimizu et al. | 290/4 R |
| 2002/0036434 A1 | * | 3/2002 | Tsuzuki et al. | 310/83 |
| 2002/0066607 A1 | * | 6/2002 | Levin | 180/65.2 |

* cited by examiner

Primary Examiner—Brian L. Johnson
Assistant Examiner—J. Allen Shriver

(57) ABSTRACT

An internal combustion engine (12) having a crankshaft (20) is coupled to a transmission (14) through an assembly (10) comprising a rotary electric machine (16) and an engine disconnect clutch (17). The stator (38) and rotor (40) of the machine are separated by a radial air gap (42), and the machine is selectively operable as an electric motor to source torque to the powertrain and as an electric generator, or alternator, to sink torque from the powertrain. The organization and arrangement provides a powertrain and method of making a powertrain for establishing and maintaining precision in the radial air gap to secure optimal efficiency of machine operation on a production basis.

21 Claims, 2 Drawing Sheets

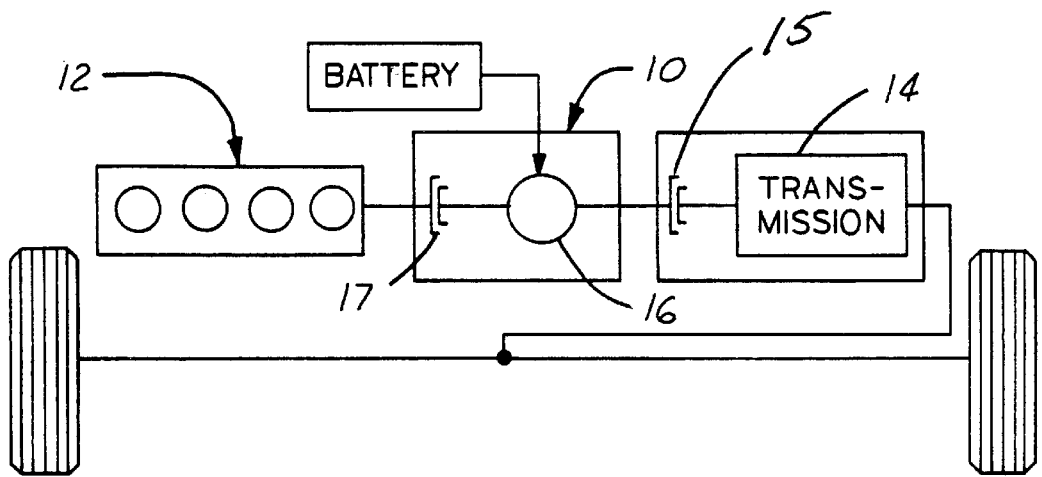
FIG. 1
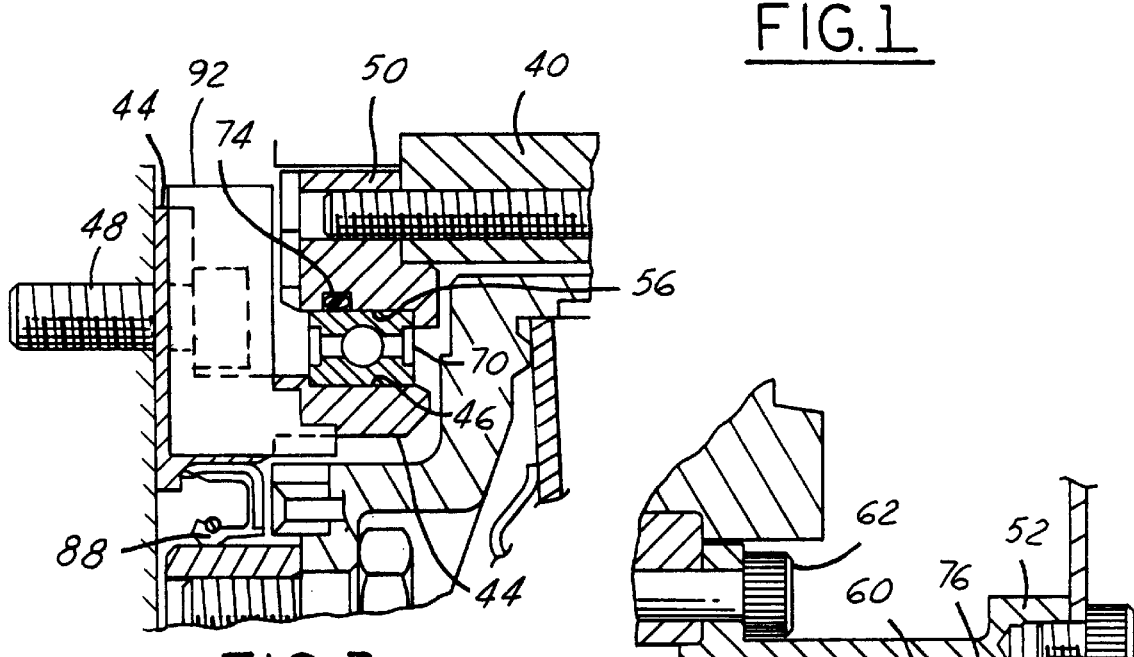
FIG. 3
FIG. 4
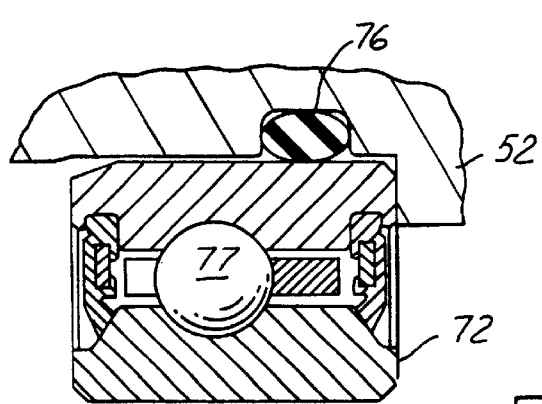
FIG. 5

HYBRID POWERTRAIN HAVING ROTARY ELECTRIC MACHINE, INCLUDING ENGINE-DISCONNECT CLUTCH, BETWEEN INTERNAL COMBUSTION ENGINE AND TRANSMISSION

BACKGROUND OF THE INVENTION

1. Field of the Invention

This invention relates generally to motor vehicle powertrains that are sometimes referred to as hybrid powertrains. Such a hybrid powertrain comprises an internal combustion (I.C.) engine and a rotary electric machine arranged to operate in various modes for more efficiently operating a motor vehicle powertrain. The rotary electric machine is capable of operating alternately as an electric motor and as an electric generator, or alternator.

2. Background Information

The state of the art is reflected in the following pending patent applications of the inventor:

SUMMARY OF THE INVENTION

The present invention relates to novel hybrid powertrains and methods of making such powertrains. The invention is especially adapted for a powertrain that can operate a vehicle solely by a rotary electric machine operating as a source of powertrain torque (i.e. as an electric motor), solely by an I.C. engine as a source of powertrain torque, or by a combination of the two. When there is a demand for driveline torque that cannot be met solely by the engine, the rotary electric machine can operate as an electric motor to make an added positive torque contribution to the vehicle driveline. When the engine is essentially meeting driveline torque demand, the rotary electric machine can smooth the pulsating engine crankshaft torque that occurs when the engine lacks a torque damper such as a flywheel. Torque smoothing is achieved by operating the rotary electric machine alternately as a motor and as a generator to make alternate small positive and negative contributions to powertrain torque for attenuating, at least to some degree, the pulsations in engine crankshaft torque.

Because the rotary electric machine is capable of operating as an electric generator, it can sink, i.e. extract, kinetic energy from the powertrain by converting that energy into electricity for re-charging an on-board electric storage medium, such as a battery. Conversion of kinetic energy from the running engine into electric energy for powering the vehicle electrical system can render the engine-driven alternator that is present in a non-hybrid vehicle potentially redundant, and therefore unnecessary, in a hybrid vehicle embodying the present invention. When the transmission is momentarily disengaged from the engine during a transmission gear change, particularly an upshift, kinetic energy may be extracted from the running engine to improve shift quality by more quickly changing crankshaft speed. When the energy that the rotary electric machine converts into electricity comes from kinetic energy of the moving vehicle, rather than the engine, the recovered energy serves to improve vehicle operating efficiency.

Because the rotary electric machine is capable of operating as an electric motor, it can be used to crank the engine at engine starting. Hence, the separate electric starter motor present in a non-hybrid vehicle may be redundant, and therefore unnecessary, in a hybrid vehicle embodying the present invention.

One generic aspect of the invention relates to a method of making a motor vehicle powertrain comprising an internal combustion engine having a crankshaft coupled to a transmission through an assembly comprising a rotary electric machine and a clutch through which the crankshaft can be selectively engaged with and disengaged from the assembly. The rotary electric machine comprises a stator and a rotor that are separated by a radial air gap, and the rotary electric machine is selectively operable as an electric motor to source torque to the powertrain and as an electric generator, or alternator, to sink torque from the powertrain. The sourcing of torque to the powertrain and the sinking of torque from the powertrain may occur in any of the several ways mentioned earlier.

The method comprises assembling a ring that comprises a circular pilot surface to a face of the engine in surrounding relation to the crankshaft to establish concentricity of the circular pilot surface to an axis of rotation of the crankshaft; assembling the stator to the face of the engine to establish concentricity of the stator to the axis of rotation of the crankshaft; assembling the rotor into the powertrain, including piloting a circular pilot surface of an engine side bracket that is disposed over an engine side of the rotor facing the engine to the circular pilot surface of the ring via an engine side bearing assembly to establish concentricity of the engine side of the rotor to the crankshaft axis; coupling an output of the clutch to a transmission side bracket that has a circular pilot surface to couple the transmission side bracket and output of the clutch for rotation in unison; assembling the coupled clutch and transmission side bracket into the powertrain by disposing the clutch within a space surrounded by the rotor and coupling an input of the clutch to the crankshaft to couple the clutch input and the crankshaft for rotation in unison, and disposing the transmission side bracket over a transmission side of the rotor that is opposite the engine side; fastening the two brackets and the rotor for rotation in unison about the crankshaft axis of rotation; and assembling the transmission into the powertrain including the steps of establishing a coupling of the input of the transmission to the output of he clutch to couple the transmission input and the clutch output for rotation in unison about the crankshaft axis of rotation, of piloting a first circular pilot surface of the transmission that is concentric with the transmission input to the circular pilot surface of the stator, and establishing concentricity of the transmission side bracket to the transmission through a transmission side bearing assembly disposed between the pilot surface of the transmission side bracket and a second circular pilot surface of the transmission that is concentric with the transmission input.

Another aspect relates to a motor vehicle powertrain comprising an internal combustion engine having a crankshaft coupled to a transmission through an assembly comprising a rotary electric machine and a clutch through which the crankshaft can be selectively engaged with and disengaged from the assembly. The rotary electric machine comprises a stator and a rotor that are separated by a radial air gap, and the rotary electric machine is selectively operable as an electric motor to source torque to the powertrain and as an electric generator, or alternator, to sink torque from the powertrain. The sourcing of torque to the powertrain and the sinking of torque from the powertrain may occur in any of the several ways mentioned earlier.

The stator is assembled to the face of the engine to establish concentricity of the stator to the axis of rotation of the crankshaft. A circular pilot surface is disposed on a face of the engine in surrounding relation to the crankshaft and concentric with the crankshaft. An engine side bracket is disposed over an engine side of the rotor facing the engine and comprises a circular pilot surface. A transmission side bracket is disposed over a transmission side of the rotor opposite the engine side and comprises a circular pilot surface. The transmission side bracket and an input of the transmission are coupled together for rotation in unison. Fasteners fasten the two brackets and the rotor together for rotation in unison about the crankshaft axis of rotation with the circular pilot surfaces of the two brackets concentric. A clutch is disposed within a space surrounded by the rotor and comprises an input coupled to the crankshaft for rotation in unison with the crankshaft and an output coupled to the transmission side bracket for rotation in unison with the transmission side bracket, and hence also with the transmission input. An engine side bearing assembly comprises inner and outer races. One of the races is piloted on the circular pilot surface on the engine surrounding the crankshaft and the other of the races is piloted on the circular pilot surface of the engine side bracket to establish concentricity of the engine side of the rotor to the axis of rotation of the crankshaft. A transmission side bearing assembly comprises inner and outer races. One of the races of the transmission side bearing assembly is piloted on a circular pilot surface of the transmission that is concentric with the transmission input and the other of the races is piloted on the circular pilot surface of the transmission side bracket.

Still another aspect relates to a motor vehicle powertrain comprising an internal combustion engine having a crankshaft that rotates about an axis of rotation and that is coupled to a transmission through an assembly comprising a rotary electric machine and an engine disconnect clutch. The rotary electric machine comprises a stator and a rotor that are separated by a radial air gap concentric to the axis of rotation of the crankshaft, and the rotary electric machine is selectively operable as an electric motor to source torque to the powertrain and as an electric generator to sink torque from the powertrain. An engine side bracket is disposed over an engine side of the rotor facing the engine and a transmission side bracket is disposed over a transmission side of the rotor opposite the engine side. The two brackets are fastened together to clamp the rotor between them. The clutch is disposed within a space surrounded by the rotor and comprises an input coupled to the crankshaft for rotation in unison with the crankshaft and an output coupled to the transmission side bracket and the transmission input for rotation in unison with the transmission side bracket and the transmission input. The coupling of the clutch input to the crankshaft provides axial lost-motion that does not interfere with axial play of the crankshaft relative to the engine. An engine side bearing assembly comprises inner and outer races. One of the races is piloted on a circular pilot surface on the engine surrounding the crankshaft and the other of the races is piloted on a circular pilot surface of the engine side bracket to establish concentricity of the engine side of the rotor to the axis of rotation of the crankshaft. A transmission side bearing assembly comprises inner and outer races. One of the races of the transmission side bearing assembly is piloted on a circular pilot surface of the transmission that is concentric with the transmission input and the other of the races is piloted on a circular pilot surface of the transmission side bracket. The bearing assemblies axially capture the brackets and rotor while providing axial lost-motion play of the brackets and rotor relative to the bearing assemblies to allow the rotor to position itself axially with respect to the magnetic field of the stator for most efficient operation.

Still another aspect relates to a motor vehicle powertrain comprising an internal combustion engine having a crankshaft that rotates about an axis of rotation and that is coupled to a transmission through an assembly comprising a rotary electric machine and an engine disconnect clutch. The rotary electric machine comprises a stator and a rotor that are separated by a radial air gap concentric to the axis of rotation of the crankshaft, and the rotary electric machine is selectively operable as an electric motor to source torque to the powertrain and as an electric generator to sink torque from the powertrain. The clutch comprises an input that rotates in unison with the crankshaft and an output that rotates in unison with the rotor. The rotor is supported for rotation concentric with the axis of rotation of the crankshaft. An engine side bracket is disposed over an engine side of the rotor facing the engine. A transmission side bracket is disposed over a transmission side of the rotor opposite the engine side and coupled with an input of the transmission for rotation in unison with the transmission input. Each bracket comprises a respective circular pilot surface. Fasteners fasten the two brackets and the rotor together for rotation in unison and with the circular pilot surfaces of the two brackets concentric. The clutch is disposed within a space surrounded by the rotor and comprises an input coupled to the crankshaft for rotation in unison with the crankshaft and an output coupled to the transmission side bracket for rotation in unison with the transmission side bracket, and hence with the transmission input. The rotor is supported for rotation by an engine side bearing assembly comprising inner and outer races, wherein one of the races is piloted on a circular pilot surface on the engine surrounding the crankshaft and the other of the races is piloted on the circular pilot surface of the engine side bracket to establish concentricity of the engine side of the rotor to the axis of rotation of the crankshaft, and by a transmission side bearing assembly comprising inner and outer races, wherein one of the races of the transmission side bearing assembly is piloted on a circular pilot surface of the transmission that is concentric with the transmission input and the other of the races is piloted on the circular pilot surface of the transmission side bracket. The pilot surface of each bracket comprises an adjacent concentric groove containing an O-ring having a periphery protruding from the groove, and one race of each bearing assembly is interference fit to the protruding periphery of the respective O-ring. Each O-ring is asymmetric, in the axial direction, to a respective set of bearing elements captured between the races of the respective bearing assembly.

Still another aspect relates to a motor vehicle powertrain comprising an internal combustion engine having a crankshaft that rotates about an axis of rotation and that is coupled to a transmission through an assembly comprising a rotary electric machine and an engine disconnect clutch. The rotary electric machine comprises a stator and a rotor that are separated by a radial air gap concentric to the axis of rotation of the crankshaft, and the rotary electric machine is selectively operable as an electric motor to source torque to the powertrain and as an electric generator to sink torque from the powertrain. The clutch comprises an input that rotates in unison with the crankshaft and an output that rotates in unison with the rotor. A single sensor comprising dual sensing elements is disposed such that a first sensing element can sense crankshaft rotation and a second sensing element can sense rotor rotation.

Further aspects will be seen in various features of a presently preferred embodiment of the invention that will be described in detail.

BRIEF DESCRIPTION OF THE DRAWINGS

The drawings that will now be briefly described are incorporated herein to illustrate a preferred embodiment of the invention and a best mode presently contemplated for carrying out the invention.

FIG. 1 is a schematic diagram of the hybrid powertrain.

FIG. 3 is an enlarged view of one portion of FIG. 2.

FIG. 4 is an enlarged view of another portion of FIG. 2.

FIG. 5 is an enlarged view of a portion of FIG. 4.

DESCRIPTION OF THE PREFERRED EMBODIMENT

Figure 2:
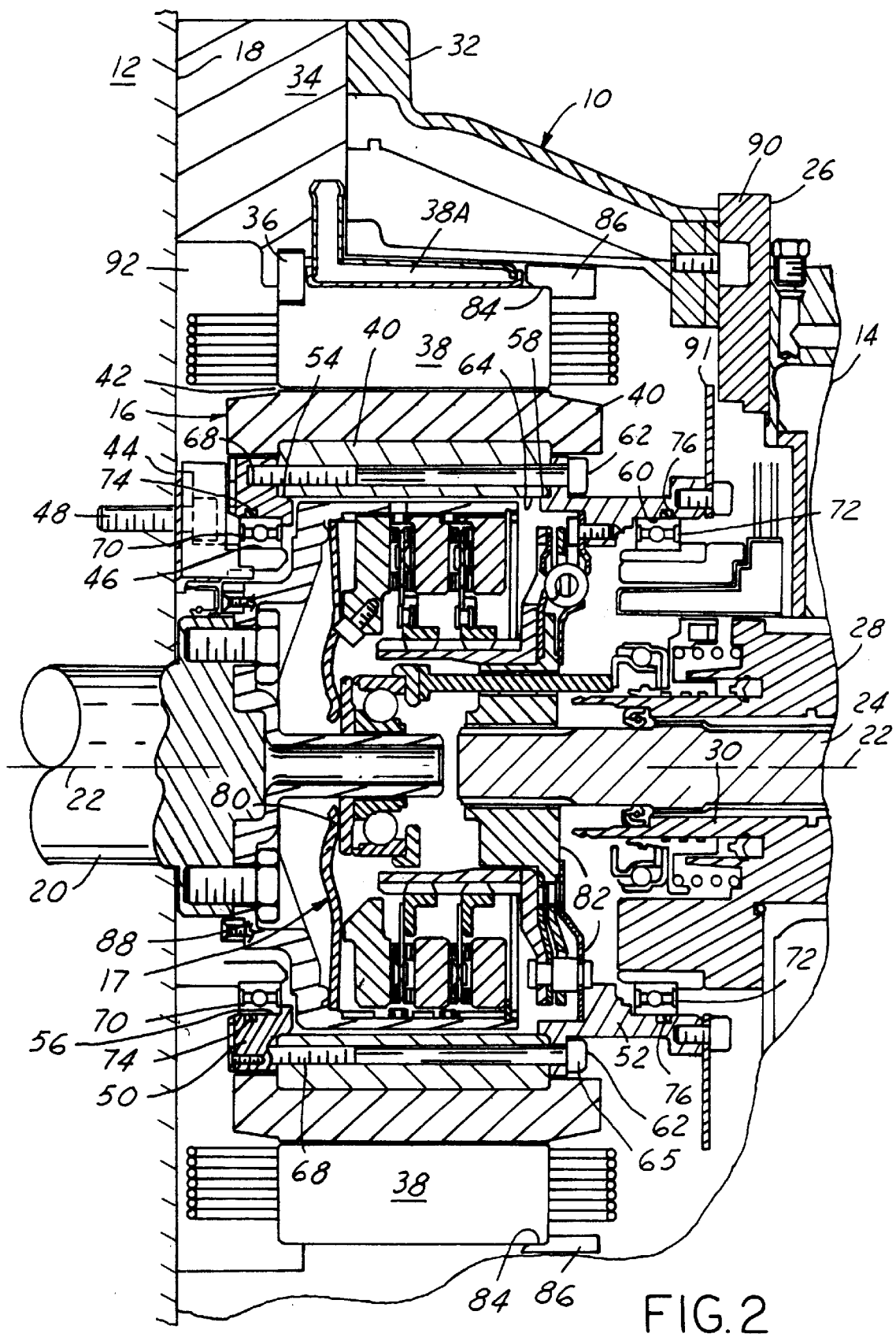
FIG. 2 is a central vertical cross section view through the portion of an exemplary hybrid powertrain of a motor vehicle in accordance with principles of the present invention.

FIG. 1 shows schematically a portion of a motor vehicle hybrid powertrain comprising an assembly 10 disposed between an internal combustion engine 12 and a transmission 14 of a transaxle. While the reader may recognize that the particular powertrain configuration shown in FIG. 1 is that of a front wheel drive vehicle, it is to be appreciated that principles of the invention encompass various powertrain configurations, including that of a rear wheel drive vehicle where a transmission, a driveshaft, and a rear axle would replace transaxle 14.

Assembly 10 comprises a rotary electric machine 16 and mechanism for operatively relating engine 12 and rotary electric machine 16 with transmission 14. The mechanism of assembly 10 includes an engine disconnect clutch 17 for selectively engaging and disengaging assembly 10 with and from engine 12.

Transmission 14 may be placed in any of several different drive gears to couple engine 12 and/or rotary electric machine 16 at various gear ratios through a driveline leading to driven wheels of the vehicle, as pictured. A representative transmission may include several forward drive gears, a reverse gear, and a neutral gear. Transmission 14 also includes a driveline clutch 15 for selectively engaging and disengaging the transmission gear mechanism with and from assembly 10.

Engine 12 comprises a rear face 18 from which an end of an engine crankshaft 20 emerges. The crankshaft rotates about an axis of rotation 22. Transmission 14 comprises an input shaft 24 that rotates about an axis that is coincident with axis 22. Transmission 14 further includes a casing 26 that encloses the interior of the transmission. An actuator 28 for operating engine disconnect clutch 17 mounts on transmission 14 and is constructed to have a portion of its body 30 surrounding input shaft 24. Actuator 28 may be powered by transmission hydraulic fluid or by a separate stand-alone unit.

Casing 26 extends forwardly as a bell housing surrounding assembly 10. A front face of a perimeter 32 of the bell housing abuts a rear face of a spacer 34 having a front face disposed against engine rear face 18, thereby enclosing assembly 10. Spacer 34 is a ring whose shape, as viewed along axis 22, matches that of the bell housing perimeter 32. Several dowel pins 36 accurately center spacer 34 to rotary electric machine 16.

Rotary electric machine 16 comprises a stator 38 and a rotor 40, both of which are arranged concentric with axis 22. Dowels pins 36 center spacer 34 to stator 38. A cooling jacket 38A surrounds stator 38. A small radial air gap 42 separates the outer periphery of rotor 40 and the inner periphery of stator 38. Principles of the invention are believed to provide improved dimensional control of air gap 42 in the mass production of assemblies 12, thereby improving efficiency and durability of mass-produced rotary electric machines 16 and assemblies 12, with favorable consequences on vehicle performance and fuel economy.

A ring 44 that has a circular pilot surface 46 is disposed against, and fastened by fasteners 48 to, engine face 18 in surrounding relation to crankshaft 20 to place surface 46 concentric with axis 22. An engine side bracket 50 is disposed over an engine side of rotor 40 facing engine 12, and a transmission side bracket 52 is disposed over a transmission side of rotor 40 facing transmission 14. Engine side bracket 50 comprises two circular pilot surfaces 54, 56. Transmission side bracket 52 also comprises two circular pilot surfaces 58, 60. Fasteners 62 fasten brackets 50,52 and rotor 40 together. Pilot surfaces 54,58 pilot the respective brackets 50,52 to a pilot surface 64 of rotor 40 establishing concentricity of the two brackets and the rotor with axis 22. Fasteners 62 comprise heads 65 and shanks having threaded ends 68. The threaded end of each fastener 62 is passed through a respective clearance hole in bracket 52 and an aligned clearance hole in rotor 40 to thread into an aligned threaded hole in bracket 50. The final tightening of fasteners 62 forces the two brackets together, clamping rotor 40 between them. The tightening must be sufficient to tension fasteners 62 such that the frictional forces created between abutted faces are capable of transmitting torque through them without slippage.

An engine side bearing assembly 70 and a transmission side bearing assembly 72 support rotor 40 and its two brackets 50, 52 for rotation about axis 22. Each bearing assembly 70, 72 comprises respective outer and inner races containing a set of bearing elements, such as spheres, needles, or rollers, between them. Circular pilot surface 56 of bracket 50 contains an adjacent circular groove in which an O-ring 74 is disposed concentric with pilot surface 56. An inner periphery of O-ring 74 protrudes slightly from the groove. Likewise circular pilot surface 60 of bracket 52 contains an adjacent circular groove in which an O-ring 76 is disposed concentric with pilot surface 60 and from which the O-ring protrudes in the same way as O-ring 74 from its groove. The inner race of each bearing assembly may be pressed or lightly adhered to the respective pilot surface on which it is piloted to avoid relative rotation between them.

The circular outer surface of the outer bearing race of bearing assembly 70 pilots the bearing assembly to circular pilot surface 56 of bracket 50. Because the inner periphery of O-ring 74 presents an interference fit to the outer race, the act of piloting causes the O-ring to be uniformly compressed into the groove as the race passes through the O-ring. But the compressed O-ring now exerts a friction force sufficient to constrain the outer race against rotation relative to the engine side bracket. This allows the bearing assembly to be retained on the bracket without separate anti-rotation devices, such as pins. O-ring 76 is compressed within its groove in the same way to constrain the outer race of bearing assembly 72 against rotation.

Each O-ring 74, 76 is asymmetric, in the axial direction, to the respective set of bearing elements captured between inner and outer races of the respective bearing assembly 70, 72. In this way a radial load that acts on either bearing assembly with sufficient force to compress the respective O-ring fully into the respective groove and force the respective pilot surface 56, 60 against the respective outer race will not distort the contour of the race groove in which the respective set of bearing elements ride. That this is true can be appreciated by considering FIG. 5 where the bearing elements are spheres 77. Were O-ring 76 at the same axial location as the spheres, pilot surface 60 would contact the outer bearing race at axially opposite sides of the race groove 79 to apply forces to the race at axially opposite sides of groove 79. Sufficiently large forces could warp the contour of the groove, possibly affecting bearing performance. By asymmetric arrangement of the O-ring to the bearing elements, such warping tendency is avoided. By avoiding a warping tendency, the thickness of the race in the radial direction can be smaller than that required to resist such warping. Such smaller race thickness can save weight and space.

Clutch 17 comprises an input 80 that is coupled to crankshaft 20 so that the two rotate in unison. Input 80 may comprise a clutch cover having a hub that is coupled, and fastened by screws, to a flange of the crankshaft in any suitable manner. Clutch 17 also has an output 82 that is coupled to transmission side bracket 52 for rotation in unison with the transmission side bracket and that is coupled to transmission input shaft 24. Output 82 may comprise a plate that is fastened to bracket 52 in any suitable manner and an internal splined ring that is fit to an external spline on shaft 24. The association of assembly 10 with engine 12 does not interfere with the small amount of axial play that exists between crankshaft 20 and the block in engine 12 because the coupling of clutch 17 to the crankshaft allows for axial lost motion between them. Assembly 10 itself provides a small amount of axial play in the journaling of rotor 40. FIG. 3 shows the outer race of bearing assembly 70 abutted axially with a shoulder of bracket 50, while the outer race of bearing assembly 72 is spaced axially from a shoulder of bracket 52 as shown in FIG. 4. Accordingly, it can be appreciated that the assembly comprising rotor 40 and brackets 50, 52 can move axially from the illustrated position toward transmission 14 until the outer race of bearing assembly 72 about the confronting shoulder of bracket 52. This defines a range of axial play that allows the rotor to position itself axially with respect to the magnetic field of stator 38 for most efficient operation.

The use of O-rings 74, 76 without other anti-rotation constraints allows relative axial movement to occur between the confronting pilot surfaces due to differential thermal expansion and contraction between diverse materials such as steel of the electrical machine and aluminum of other parts.

The method of making assembly 10 comprises assembling ring 44 to engine face 18 using a locating tool to establish concentricity of circular pilot surface 46 to axis 22. Stator 38, with spacer 34 doweled to it by dowel pins 36, is assembled to engine face 18 to be concentric to axis 22. A tool is used to secure concentricity. The use of tools for securing these concentricities assures the precision and integrity of the small radial air gap that is important in maximizing efficiency of a particular electric machine used in assembly 10 although principles of the invention are not dependent on any particular electric machine. The use of such tools is considered important because it is believed that prevailing tolerances for manufactured automotive components cannot assure air gap precision on a production basis.

Engine side bracket 50, including bearing assembly 70, is next piloted on pilot surface 46 of ring 44. Rotor 40 is piloted to surface 56. Then clutch 17, with transmission side bracket 52 attached, is assembled. Fasteners 62 are then installed and tightened. With bearing assembly 72 piloted on actuator body 30, transmission 14 is assembled into the powertrain to couple input shaft 24 with clutch output 82 via the spline connection and to operatively associate actuator 28 with clutch 17. As transmission 14 is being assembled into the powertrain, a circular pilot surface 84 provided by guide pads 86 on the interior of the extension of the transmission housing locates to stator 38.

It is believed that the relationships and constructions that have been described above and illustrated in the drawing endow rotary electric machine 16 with greater precision in concentricity of the outer rotor periphery to the inner stator periphery and an attendant ability to set and maintain a smaller radial air gap between them. Such an air gap improves operating efficiency of the electric machine. It is further believed that the relationships and constructions provide an improved assembly method and improved packaging for the assembly.

When the powertrain is being driven solely by engine 12, actuator 28 is not actuated so that clutch 17 remains engaged to transmit rotation of crankshaft 20 to rotate transmission input shaft 24 in unison with the crankshaft. Because clutch output 82 is also fastened to transmission side bracket 52, rotor 40, including both brackets 50, 52, rotates about axis 22 with the rotating crankshaft 20 and transmission input shaft 24. It is believed advantageous for the rotor to rotate synchronously with the input shaft 24 even when rotary electric machine 16 is operating neither as a torque source nor a torque sink for the powertrain. In this way a transition in torque input from the engine to the rotary electric machine will not require the rotor to be accelerated from zero speed, or from any speed less than the speed at which the crankshaft and transmission input shaft were rotating when the torque transition commenced. Without a necessity of accelerating the rotor, it is believed that a vehicle will exhibit performance that is more acceptable to the driver.

With clutch 17 engaged, electric machine 16 can operate as a motor to start the engine, and once the engine has started, it can function as an alternator, or generator, to supply electricity to the vehicle electrical system.

When clutch 17 is disengaged by actuation of actuator 28, crankshaft 20 is disconnected from transmission input shaft 24. It is believed that improved powertrain efficiency can be obtained by disconnecting the crankshaft in this way when the vehicle is being propelled solely by rotary electric machine 16.

Rotary electric machine 16 may also operate to regeneratively recover vehicle energy by converting kinetic energy in the driveline to electricity for use in recharging an electric energy storage medium of the vehicle electrical system.

It is believed that the foregoing disclosure of the invention has described an assembly that can be manufactured with improved economy and precision and that exhibits improved performance and durability in an automotive vehicle.

Although various pilot surfaces have been described as circular, it is to be appreciated that such surfaces need not be circumferentially continuous, but rather may have interruptions such as interruptions provided between circumferentially adjacent guide pads 86 that are joined the bell housing interior, such as by brazing or welding.

It should also be appreciated that certain elements in the drawing may be shown out of their true circumferential position, consistent with engineering drawing standards. For example, tool clearance is present to allow fastening of the clutch input to the crankshaft although such may not appear present because of the nature of the drawing.

Spacer 34 is present simply to adapt an existing transmission housing to an existing engine for the particular design. A longer extension of the bell housing would avoid the need for such a spacer.

To protect against intrusion of engine lubricant into the interior of the bell housing, a circular seal 88 is disposed on and concentric with ring 44. During assembly of the ring to engine face 18, a circular periphery of seal 88 assumes sealing relation to a circular periphery of the crankshaft to prevent escape of lubricant from the engine between the seal and the crankshaft.

While the specific engine disconnect clutch 17 is a dry clutch, generic principles of the invention are independent of any particular type of engine disconnect clutch.

For sensing speed of various rotating elements, one more sensors 90, 92 may be included in association with target wheels that rotate with the rotating elements of to provide respective electrical signals indicating rotation. Sensor 90 is a sensor that senses rotation of a slotted wheel 91 on bracket 52 to provide a signal of rotor speed. Sensor 92 is a sensor that comprises dual sensing elements, a first for sensing rotation of a slotted margin of the hub of clutch input 80, and a second for sensing rotation of bracket 50, and hence rotor 40. Hence, sensor 92 can sense both crankshaft speed, which is equal to the speed of clutch input 80, and rotor speed, which is equal to the speed of clutch output 82. The first sensing element may be a variable reluctance type device, and the second, a magnetoresistive type device. Ring 44 is designed to have an open area for receiving the body of sensor 92.

While a presently preferred embodiment has been illustrated and described, it is to be appreciated that the invention may be practiced in various forms within the scope of the following claims.

What is claimed is:

1. A method of making a motor vehicle powertrain comprising an internal combustion engine having a crankshaft coupled to a transmission through an assembly comprising a rotary electric machine and an engine disconnect clutch, and wherein the rotary electric machine comprises a stator and a rotor that are separated by a radial air gap and the rotary electric machine is selectively operable as an electric motor to source torque to the powertrain and as an electric generator to sink torque from the powertrain, the method comprising:

assembling a ring that comprises a circular pilot surface to a face of the engine in surrounding relation to the crankshaft to establish concentricity of the circular pilot surface to an axis of rotation of the crankshaft;

assembling the stator to the face of the engine to establish concentricity of the stator and a circular pilot surface of the stator to the axis of rotation of the crankshaft;

assembling the rotor into the powertrain, including piloting a circular pilot surface of an engine side bracket that is disposed over an engine side of the rotor facing the engine to the circular pilot surface of the ring via an engine side bearing assembly to establish concentricity of the engine side of the rotor to the crankshaft axis;

assembling a transmission side bracket having a circular pilot surface to an output of the clutch to couple the clutch output and the transmission side bracket for rotation in unison;

then assembling the clutch and transmission side bracket into the powertrain by disposing the clutch within a space surrounded by the rotor and coupling an input of the clutch to the crankshaft to couple the clutch input and the crankshaft for rotation in unison, and disposing the transmission side bracket over a transmission side of the rotor opposite the engine side;

fastening the two brackets and the rotor for rotation in unison about the crankshaft axis of rotation; and assembling the transmission into the powertrain including the steps of establishing a coupling of the input of the transmission to the output of the clutch to couple the transmission input and the clutch output for rotation in unison about the crankshaft axis of rotation, of piloting a first circular pilot surface of the transmission that is concentric with the transmission input to the circular pilot surface of the stator, and establishing concentricity of the transmission side bracket to the transmission through a transmission side bearing assembly disposed between the pilot surface of the transmission side bracket and a second circular pilot surface of the transmission that is concentric with the transmission input.

2. A method as set forth in claim 1 including a circular seal disposed on and concentric with the ring, and wherein the step of assembling the ring to the face of the engine includes placing a circular periphery of the seal in sealing relation to a circular periphery of the crankshaft to prevent escape of lubricant from the engine between the seal and the crankshaft.

3. A method as set forth in claim 1 in which the step of assembling the ring to the face of the engine to establish concentricity of the circular pilot surface of the ring to the axis of rotation of the crankshaft comprises using a first tool to establish concentricity, and the step of assembling the stator to the face of the engine to establish concentricity of the stator and the circular pilot surface of the stator to the axis of rotation of the crankshaft comprises using a second tool to establish concentricity.

4. A method as set forth in claim 1 in which the pilot surface of the engine side bracket comprises an adjacent circular groove containing an O-ring that is concentric with, and has an inner periphery protruding from, the groove, and wherein the engine side bearing assembly is related to the engine side bracket by interference fitting an outer race of the engine side bearing assembly within the protruding inner periphery of the O-ring.

5. A method as set forth in claim 4 in which the pilot surface of the transmission side bracket comprises an adjacent circular groove containing an O-ring that is concentric with, and has an inner periphery protruding from, the transmission side bracket groove, and wherein the transmission side bearing assembly is related to the transmission side bracket by interference fitting an outer race of the transmission side bearing assembly within the protruding inner periphery of the transmission side bracket O-ring.

6. A method as set forth in claim 1 in which the pilot surface of the transmission side bracket comprises an adjacent circular groove containing an O-ring that is concentric with, and has an inner periphery protruding from, the groove, and wherein the transmission side bearing assembly is related to the transmission side bracket by interference fitting an outer race of the transmission side bearing assembly within the protruding inner periphery of the O-ring.

7. A method as set forth in claim 1 in which the step of assembling the rotor into the powertrain includes piloting a first circular pilot surface on the rotor to a further circular pilot surface on the engine side bracket and piloting a second circular pilot surface on the rotor to a further circular pilot surface on the transmission side bracket.

8. A method as set forth in claim 7 including headed fasteners comprising shanks having threaded ends for fastening the two brackets and rotor together for rotation in unison, and wherein the step of fastening the two brackets and the rotor together for rotation in unison comprises clamping the rotor between the two brackets by passing the shanks through through-holes in one of the brackets and in the rotor and threading the threaded ends into threaded holes in the other of the brackets to develop sufficient tension in the fasteners to force mutually abutted surfaces of the engine side bracket and the rotor and mutually abutted surfaces of the transmission side bracket and the rotor together to develop sufficient friction for torque transfer via the respective mutually abutted surfaces.

9. A method as set forth in claim 1 in which the step of assembling the stator to the face of the engine to establish concentricity of the stator to the axis of rotation of the crankshaft comprises disposing a spacer ring between an engine side face of the stator and the face of the engine.

10. A motor vehicle powertrain comprising:
an internal combustion engine having a crankshaft that rotates about an axis of rotation and that is coupled to a transmission through an assembly comprising a rotary electric machine and an engine disconnect clutch;
wherein the rotary electric machine comprises a stator and a rotor that are separated by a radial air gap, the stator is assembled to the face of the engine to establish concentricity of the stator to the axis of rotation of the crankshaft, and the rotary electric machine is selectively operable as an electric motor to source torque to the powertrain and as an electric generator to sink torque from the powertrain;
a circular pilot surface disposed on a face of the engine in surrounding relation to the crankshaft and concentric with the crankshaft;
an engine side bracket that is disposed over an engine side of the rotor facing the engine and comprises a circular pilot surface;
a transmission side bracket that is disposed over a transmission side of the rotor opposite the engine side, that is coupled with an input of the transmission for rotation in unison with the transmission input, and that comprises a circular pilot surface;
fasteners fastening the two brackets and the rotor together for rotation in unison and with the circular pilot surfaces of the two brackets concentric;
the clutch being disposed within a space surrounded by the rotor and comprising an input coupled to the crankshaft for rotation in unison with the crankshaft and an output coupled to the transmission side bracket for rotation in unison with the transmission side bracket and the transmission input;
an engine side bearing assembly comprising inner and outer races, wherein one of the races is piloted on the circular pilot surface on the engine surrounding the crankshaft and the other of the races is piloted on the circular pilot surface of the engine side bracket to establish concentricity of the engine side of the rotor to the axis of rotation of the crankshaft; and
a transmission side bearing assembly comprising inner and outer races, wherein one of the races of the transmission side bearing assembly is piloted on a circular pilot surface of the transmission that is concentric with the transmission input and the other of the races is piloted on the circular pilot surface of the transmission side bracket.

11. A motor vehicle powertrain as set forth in claim 10 in which the circular pilot surface disposed on a face of the engine in surrounding relation to the crankshaft and concentric with the crankshaft is disposed on a ring that is fastened to the face of the engine.

12. A motor vehicle powertrain as set forth in claim 11 including a circular seal that is disposed on, and concentric with, the ring, and that comprises a circular periphery in sealing relation to a circular periphery of the crankshaft to prevent escape of lubricant from the engine between the seal and the crankshaft.

13. A motor vehicle powertrain as set forth in claim 10 in which the transmission comprises a housing, a portion of which extends toward the engine in covering relation to the rotary electric machine, and including a circular pilot surface on the housing that is concentric with the input of the transmission and that pilots on a circular pilot surface of the stator that is concentric with the crankshaft.

14. A motor vehicle powertrain as set forth in claim 10 in which the pilot surface of the engine side bracket comprises an adjacent concentric groove containing an O-ring having an inner periphery protruding from the groove, and the outer race of the engine side bearing assembly is interference fit within the protruding inner periphery of the O-ring.

15. A motor vehicle powertrain as set forth in claim 14 in which the pilot surface of the transmission side bracket comprises an adjacent concentric groove containing an O-ring having an inner periphery protruding from the transmission side bracket groove, and the outer race of the transmission side bearing assembly is interference fit within the protruding inner periphery of the transmission side bracket O-ring.

16. A motor vehicle powertrain as set forth in claim 10 in which the pilot surface of the transmission side bracket comprises an adjacent concentric groove containing an O-ring having an inner periphery protruding from the groove, and the outer race of the transmission side bearing assembly is interference fit within the protruding inner periphery of the O-ring.

17. A motor vehicle powertrain as set forth in claim 10 in which the rotor comprises a first circular pilot surface piloted to a further circular pilot surface on the engine side bracket and a second circular pilot surface piloted to a further circular pilot surface on the transmission side bracket.

18. A motor vehicle powertrain as set forth in claim 10 including headed fasteners comprising shanks having threaded ends for fastening the two brackets and rotor together for rotation in unison by clamping the rotor between the two brackets, wherein the shanks pass through through-holes in one of the brackets and in the rotor and the threaded ends thread into threaded holes in the other of the brackets with sufficient tension in the fasteners to force mutually abutted surfaces of the engine side bracket and the rotor and mutually abutted surfaces of the transmission side bracket and the rotor together to develop sufficient friction for torque transfer via the respective mutually abutted surfaces.

19. A motor vehicle powertrain comprising:
an internal combustion engine having a crankshaft that rotates about an axis of rotation and that is coupled to a transmission through an assembly comprising a rotary electric machine and an engine disconnect clutch;
wherein the rotary electric machine comprises a stator and a rotor that are separated by a radial air gap concentric to the axis of rotation of the crankshaft, and the rotary electric machine is selectively operable as an electric motor to source torque to the powertrain and as an electric generator to sink torque from the powertrain;
an engine side bracket disposed over an engine side of the rotor facing the engine and a transmission side bracket disposed over a transmission side of the rotor opposite the engine side that are fastened together to clamp the rotor between them;
the transmission having an input to which the transmission side bracket is coupled for rotation in unison with the transmission input;

the clutch being disposed within a space surrounded by the rotor and comprising an input coupled to the crankshaft for rotation in unison with the crankshaft and an output coupled to the transmission side bracket for rotation in unison with the transmission side bracket and the transmission input;

wherein the coupling of the clutch input to the crankshaft provides axial lost-motion that does not interfere with axial play of the crankshaft relative to the engine;

an engine side bearing assembly comprising inner and outer races, wherein one of the races is piloted on a circular pilot surface on the engine surrounding the crankshaft and the other of the races is piloted on a circular pilot surface of the engine side bracket to establish concentricity of the engine side of the rotor to the axis of rotation of the crankshaft;

a transmission side bearing assembly comprising inner and outer races, wherein one of the races of the transmission side bearing assembly is piloted on a circular pilot surface of the transmission that is concentric with the transmission input and the other of the races is piloted on a circular pilot surface of the transmission side bracket; and wherein the bearing assemblies axially capture the brackets and rotor while providing axial lost-motion play of the brackets and rotor relative to the bearing assemblies that allows the rotor to position itself axially with respect to the magnetic field of the stator for most efficient operation.

20. A motor vehicle powertrain comprising:

an internal combustion engine having a crankshaft that rotates about an axis of rotation and that is coupled to a transmission through an assembly comprising a rotary electric machine and an engine disconnect clutch;

wherein the rotary electric machine comprises a stator and a rotor that are separated by a radial air gap, the rotor is supported for rotation concentric with the axis of rotation of the crankshaft, and the rotary electric machine is selectively operable as an electric motor to source torque to the powertrain and as an electric generator to sink torque from the powertrain;

an engine side bracket that is disposed over an engine side of the rotor facing the engine and comprises a circular pilot surface;

a transmission side bracket that is disposed over a transmission side of the rotor opposite the engine side, that is coupled with an input of the transmission for rotation in unison with the transmission input, and that comprises a circular pilot surface;

fasteners fastening the two brackets and the rotor together for rotation in unison and with the circular pilot surfaces of the two brackets concentric;

the clutch being disposed within a space surrounded by the rotor and comprising an input coupled to the crankshaft for rotation in unison with the crankshaft and an output coupled to the transmission side bracket and to the transmission input for rotation in unison with the transmission side bracket and the transmission input;

wherein the rotor is supported for rotation by an engine side bearing assembly comprising inner and outer races, wherein one of the races is piloted on a circular pilot surface on the engine surrounding the crankshaft and the other of the races is piloted on the circular pilot surface of the engine side bracket to establish concentricity of the engine side of the rotor to the axis of rotation of the crankshaft, and by a transmission side bearing assembly comprising inner and outer races, wherein one of the races of the transmission side bearing assembly is piloted on a circular pilot surface of the transmission that is concentric with the transmission input and the other of the races is piloted on the circular pilot surface of the transmission side bracket;

wherein the pilot surface of each bracket comprises an adjacent concentric groove containing an O-ring having a periphery protruding from the groove, and one race of each bearing assembly is interference fit to the protruding periphery of the respective O-ring;

and wherein each O-ring is asymmetric, in the axial direction, to a respective set of bearing elements captured between the races of the respective bearing assembly.

21. A motor vehicle powertrain comprising:

an internal combustion engine having a crankshaft that rotates about an axis of rotation and that is coupled to a transmission through an assembly comprising a rotary electric machine and an engine disconnect clutch;

wherein the rotary electric machine comprises a stator and a rotor that are separated by a radial air gap concentric to the axis of rotation of the crankshaft, and the rotary electric machine is selectively operable as an electric motor to source torque to the powertrain and as an electric generator to sink torque from the powertrain;

wherein the clutch comprises an input that rotates in unison with the crankshaft and an output that rotates in unison with the rotor; and a single sensor comprising dual sensing elements is disposed such that a first sensing element can sense crankshaft rotation and a second sensing element can sense rotor rotation.

* * * * *